United States Patent
Chen (10) Patent No.: US 9,656,600 B2
(45) Date of Patent: May 23, 2017

(54) VEHICULAR SIDE VIEW MIRROR INCLUDING AN ILLUMINATING DEVICE

(71) Applicant: Cheng-Chung Chen, Tainan (TW)

(72) Inventor: Cheng-Chung Chen, Tainan (TW)

(*) Notice: Subject to any disclaimer, the term of this patent is extended or adjusted under 35 U.S.C. 154(b) by 100 days.

(21) Appl. No.: 14/882,142

(22) Filed: Oct. 13, 2015

(65) Prior Publication Data

US 2017/0101048 A1    Apr. 13, 2017

(51) Int. Cl.
| | | |
|---|---|---|
| *B60Q 1/00* | (2006.01) | |
| *B60Q 3/00* | (2017.01) | |
| *F21V 11/00* | (2015.01) | |
| *F21V 15/01* | (2006.01) | |
| *B60Q 1/26* | (2006.01) | |
| *B60R 1/00* | (2006.01) | |

(52) U.S. Cl.
CPC ............ *B60Q 1/2661* (2013.01); *B60R 1/006* (2013.01)

(58) Field of Classification Search
CPC ...... B60Q 1/2261; B60Q 1/2665; B60R 1/006
USPC .......................... 362/546, 548, 549, 544, 494
See application file for complete search history.

(56) References Cited

U.S. PATENT DOCUMENTS

| | | | | |
|---|---|---|---|---|
| 6,124,886 A | * | 9/2000 | DeLine ................ | B60Q 1/2665 340/433 |
| 6,595,670 B2 | * | 7/2003 | Sakamoto ............ | B60Q 1/2665 362/140 |
| 2005/0281043 A1 | * | 12/2005 | Eisenbraun ........... | B60R 1/1207 362/494 |
| 2011/0249465 A1 | * | 10/2011 | McCourt .............. | B60Q 1/2665 362/540 |

* cited by examiner

*Primary Examiner* — Anh Mai
*Assistant Examiner* — Glenn Zimmerman (57) ABSTRACT

A vehicular side view minor includes a minor seat having an engagement portion. A light-impermeable first annular wall protrudes rearwards from an inner periphery of a through-hole in the engagement portion. A minor is mounted in front of the minor seat and includes a reflective layer. A light-permeable housing is mounted to the engagement portion and has a second annular wall extending through the first annular wall. A front wall of the second annular wall includes an optical lens portion. A circuit board is received in the housing and has a lighting element. The circuit board includes a periphery abutting an abutment portion of the second annular wall. A gluing material is filled in a gluing space behind the circuit board and sealingly covers a rear surface of the circuit board, front sections of two wires, and a portion of the second annular wall to form a sealing portion.

8 Claims, 7 Drawing Sheets

VEHICULAR SIDE VIEW MIRROR INCLUDING AN ILLUMINATING DEVICE

BACKGROUND OF THE INVENTION

The present invention relates to a vehicular side view mirror and, more particularly, to a vehicular side view minor including an illuminating device to provide a waterproof effect and to reduce the number of elements for assembling purposes.

A vehicle generally includes exterior left and right side view minors permitting the driver to be aware of vehicles and pedestrians behind the two sides of the vehicle. However, the conventional side view minors only provide a passive safety function. In an improvement for providing an active illuminating alarm function, the side view minor includes an illuminating device mounted behind a minor, and a rear cover is coupled to a periphery of the minor. The light rays emitted by the illuminating device transmit through the minor. The illuminating device can provide different alarming effects according to different needs. For example, the illuminating device can work in conjunction with an obstacle sensor and can illuminate to provide an active alarm effect when the vehicle is near an obstacle. In another example, the illuminating device can be utilized as a vehicular turn signal to provide a directional warning function.

Current side view minors with an illuminating device include various structures. In a design, a substrate is bonded to a rear side of a minor. The emitting direction of electromagnetic radiation emitters mounted on the substrate is away from the minor. A reflector is mounted behind the substrate and is aligned with the electromagnetic radiation emitters. The electromagnetic radiation from the electromagnetic radiation emitters is reflected by the reflector and then transmits through the minor. An example of such a design is disclosed in U.S. Pat. No. 6,076,948. However, the electromagnetic radiation does not transmit through an optical lens and, thus, provides low illuminating efficiency. Furthermore, since rainwater is liable to penetrate into the side view minor and since the reflector is simply bonded to the substrate, the moisture is apt to penetrate in between the reflector and the substrate, leading to damage to the circuit elements and the electromagnetic radiation emitters.

In another design, an illuminating device is mounted behind a lens and is then enveloped by a housing. The emitting direction of the illuminating device is directly towards the mirror. A light control optical element is mounted between the illuminating device and the mirror, such that the light rays from the illuminating device are concentrated by the light control optical element and then transmit through the minor to provide better illuminating efficiency. An example of such a design is disclosed in U.S. Pat. No. 6,045,243. However, the illuminating device does not include any waterproof mechanism, such that water penetrating into the side view minor can damage the circuit elements and the illuminating device. Furthermore, the light control optical element is a separate component increasing the number and the costs of the elements for assembling purposes.

In another design, a side view mirror includes a back plate, a minor reflective element, a housing, a circuit element, an illumination source, a diffuse element, a casing, and an indicia element. The back plate is assembled to the mirror reflective element. The illumination source, the circuit element and the diffuser element are mounted in the housing. The diffuser element is located in front of the illumination source. The light rays emitted by the illumination source pass through the diffuser element for scattering purpose and then transmit through the indicia element and the mirror reflective element. The casing is mounted to a rear opening of the housing to seal the housing. An example of such a design is disclosed in U.S. Pat. No. 9,013,288. The assembling between the casing and the housing improves the waterproof effect. However, gaps still exist between the cover and the housing and at the wire location of the circuit element. Furthermore, the diffuser element is a separate component increasing the number and the costs of the elements for assembling purposes.

BRIEF SUMMARY OF THE INVENTION

An objective of the present invention is to provide a vehicular side view minor with an illumination device providing a waterproof effect and reducing the number of elements for assembling purposes.

A vehicular side view minor according to the present invention includes a minor seat having a front side and a rear side. An engagement portion is mounted on the rear side and includes a through-hole having an inner periphery. A first annular wall protrudes rearwards from the inner periphery of the through-hole. The first annular wall is not permeable to light. A minor is mounted in front of the minor seat. The minor includes a front face and a rear face. The rear face of the minor includes a reflective layer. An illumination device includes a housing and a circuit board. The housing is permeable to light and includes a second annular wall extending through the first annular wall. The second annular wall includes a front wall at a front end thereof. The second annular wall further includes a rear end having an opening. The second annular wall further includes an intermediate portion having a compartment. The second annular wall further includes an abutment portion on an inner face of the intermediate portion thereof. The front wall includes an optical lens portion protruding from an inner face of the front wall. The housing is mounted to the engagement portion of the minor seat. The front wall faces the rear face of the minor. The circuit board includes a front surface and a rear surface. The circuit board further includes at least one lighting element and two wires. The at least one lighting element is mounted on the front surface of the circuit board. An emitting direction of the at least one lighting element is towards the optical lens portion of the housing. The circuit board is received in the compartment of the housing. The circuit board includes a periphery abutting the abutment portion. The second annular wall further includes a gluing space located behind the rear surface of the circuit board. A gluing material is filled in the gluing space and sealingly covers the rear surface of the circuit board, front sections of the two wires, and a portion of the second annular wall of the housing to form a sealing portion. A rear cover is mounted behind the mirror seat and encloses the illumination device.

The abutment portion of the housing can be an annular stepped portion, and the front surface of the circuit board abuts the annular stepped portion.

The circuit board can be received in the compartment of the housing. The periphery of the circuit board abuts the annular stepped portion. The gluing material in a liquid state is filled into the gluing space. The sealing portion is formed after the gluing material cures and engages with the rear surface of the circuit board, the front sections of the two wires, and the portion of the second annular wall of the housing.

The first annular wall of the minor seat can include a coupling groove. The second annular wall of the housing includes a coupling member assembled in the coupling groove.

The rear face of the minor can have a portion aligned with the engagement portion of the minor seat. The portion of the rear face is a light-permeable section not covered by the reflective layer.

The inner face of the front wall of the housing and the rear face of the minor can be glued together by a gluing element.

The gluing element can be a double-sided tape including a hollow portion aligned with the optical lens portion.

The circuit board, the lighting element, and the front sections of the wires are mounted in the housing. Then, the glue material is used to sealingly cover the rear surface of the circuit board, the front sections of the two wires, and the portion of the second annular wall of the housing, forming the sealing portion that provides a waterproof effect better than conventional structures, preventing water from entering the housing to thereby prevent damage to the circuit board and the lighting element. Furthermore, the light rays emitted by the lighting element are concentrated by the optical lens portion and then transmit through the minor to increase the luminance Furthermore, the optical lens portion is directly formed on the front wall of the housing to reduce the number and the costs of the elements for assembling purposes and to reduce the assembling costs.

The present invention will become clearer in light of the following detailed description of illustrative embodiments of this invention described in connection with the drawings.

DETAILED DESCRIPTION OF THE INVENTION

In the examples of the present invention, like elements are designated by like reference numbers.

Figure 1:
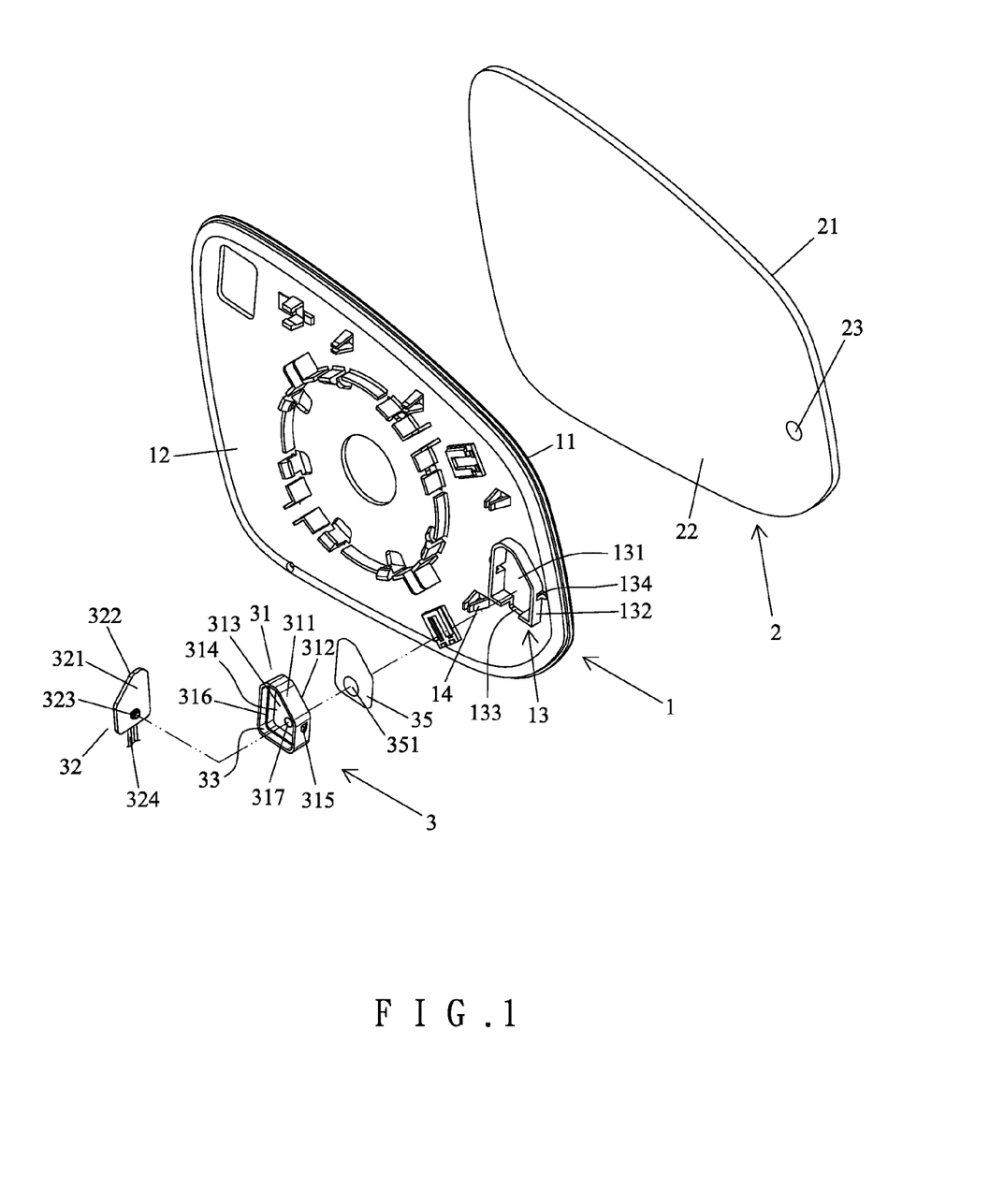
FIG. 1 is a perspective view of a partial, exploded, perspective view of a side view mirror of a first example according to the present invention, with a sealing portion and a rear cover removed for clarity.
Figure 2:
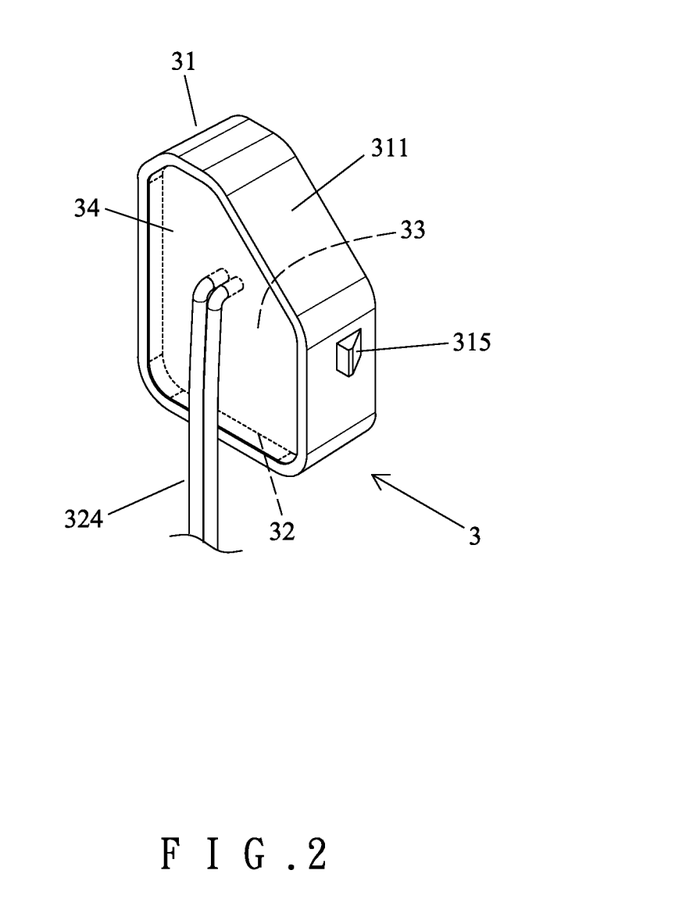
FIG. 2 is a perspective view of an illumination device of the side view mirror of the first example according to the present invention.

With reference to FIGS. 1-2, a vehicular side view mirror of a first example according to the present invention includes a mirror seat 1, a mirror 2, an illumination device 3, and a rear cover 4. The minor seat 1 includes a front side 11 and a rear side 12. An engagement portion 13 is mounted on the rear side 12 and includes a through-hole 131 having an inner periphery. A first annular wall 132 protrudes rearwards from the inner periphery of the through-hole 131 and is not permeable to light. The first annular wall 132 includes a notch 133 and a coupling groove 134. A plurality of clamping grooves 14 is provided on the rear side 12 of the mirror seat 1.

The mirror 2 is mounted in front of the mirror seat 1 and includes a front face 21 and a rear face 22. The rear face 22 of the mirror 2 includes a reflective layer. The rear face 22 of the minor 2 has a portion aligned with the engagement portion 13 of the minor seat 1. The portion of the rear face 22 is a light-permeable section 23 not covered by the reflective layer. The light-permeable section 23 can be of any desired shape according to need.

The illumination device 3 includes a housing 31 and a circuit board 32. The housing 31 is permeable to light and includes a second annular wall 311 extending through the first annular wall 132. The second annular wall 311 includes a front wall 312 at a front end thereof. The second annular wall 311 further includes a rear end having an opening 313. The second annular wall 311 further includes an intermediate portion having a compartment 314. The second annular wall 311 of the housing 31 includes a coupling member 315 assembled in the coupling groove 134. The second annular wall 311 further includes an abutment portion on an inner face of the intermediate portion thereof. In this example, the abutment portion of the housing 31 is an annular stepped portion 316.

The front wall 312 includes an optical lens portion 317 protruding from an inner face of the front wall 312. The circuit board 32 has a size slightly smaller than the compartment 314. The circuit board 32 includes a front surface 321, a rear surface 322, a lighting element 323, and two wires 324. The lighting element 323 is mounted on the front surface 321 of the circuit board 32. The emitting direction of the lighting element 323 is towards the optical lens portion 317 of the housing 31.

Figure 5:
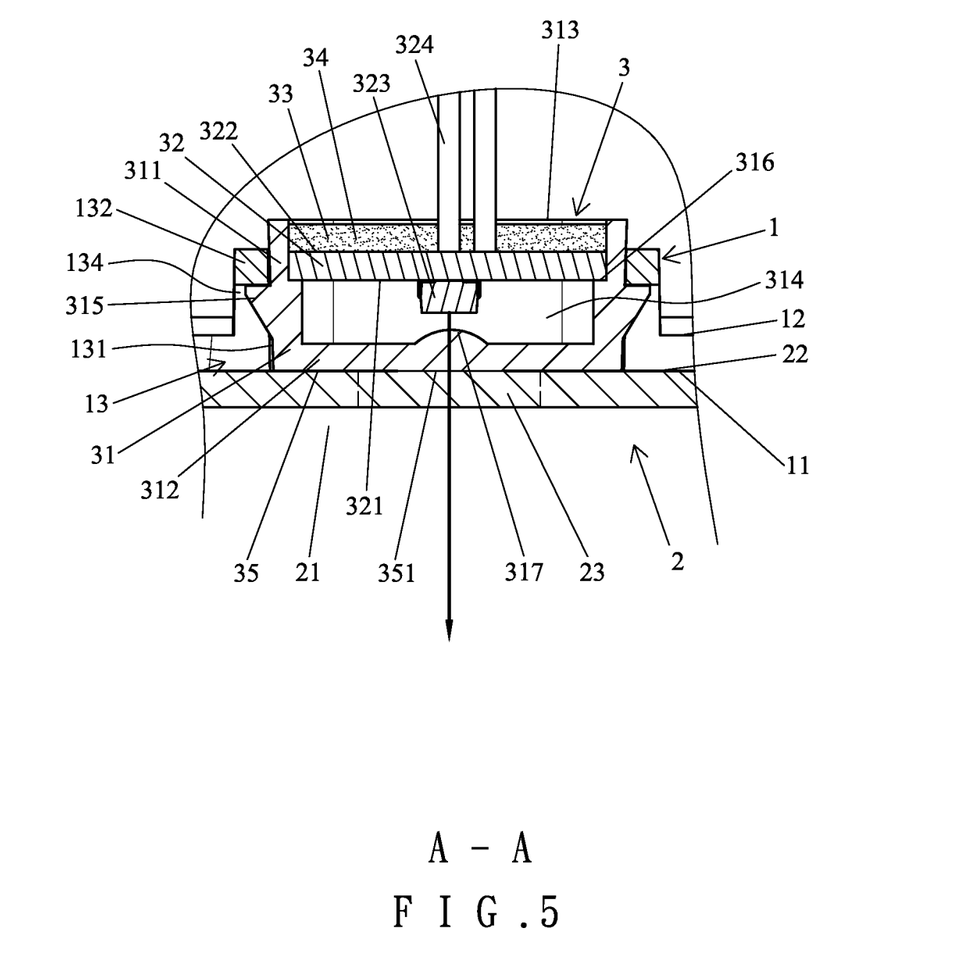
FIG. 5 is a cross sectional view taken along section line A-A of FIG. 3.

As shown in FIGS. 2 and 5, the circuit board 32 is received in the compartment 314 of the housing 31 and includes a periphery abutting the stepped portion 316. The second annular wall 311 further includes a gluing space 33 located behind the rear surface 322 of the circuit board 32. The wires 324 extend through the gluing space 33. A liquid gluing material is filled in the gluing space 33. The periphery of the front surface 321 of the circuit board 32 abuts the stepped portion 316 to avoid the liquid gluing material to flow to a location in front of the circuit board 32. A sealing portion 34 is formed after the liquid gluing material cures and engages with the rear surface 322 of the circuit board 32, front sections of the two wires 324, and a portion of the second annular wall 311 of the housing 31.

After the housing 31 is mounted to the engagement portion 13 of the minor seat 1, the inner face of the front wall 312 and the rear face 22 of the mirror 2 are glued together by a gluing element. In this embodiment, the gluing element is a double-sided tape 35 to increase the assembling reliability. Furthermore, the double-sided tape 35 includes a hollow portion 351 aligned with the optical lens portion 317 to prevent adverse effect to the outputted luminance The wires 324 can extend through the notch 133 of the first annular wall 132 of the minor seat 1 and can couple with the clamping grooves 14 to provide a sense of quality after assembly.

Figure 3:
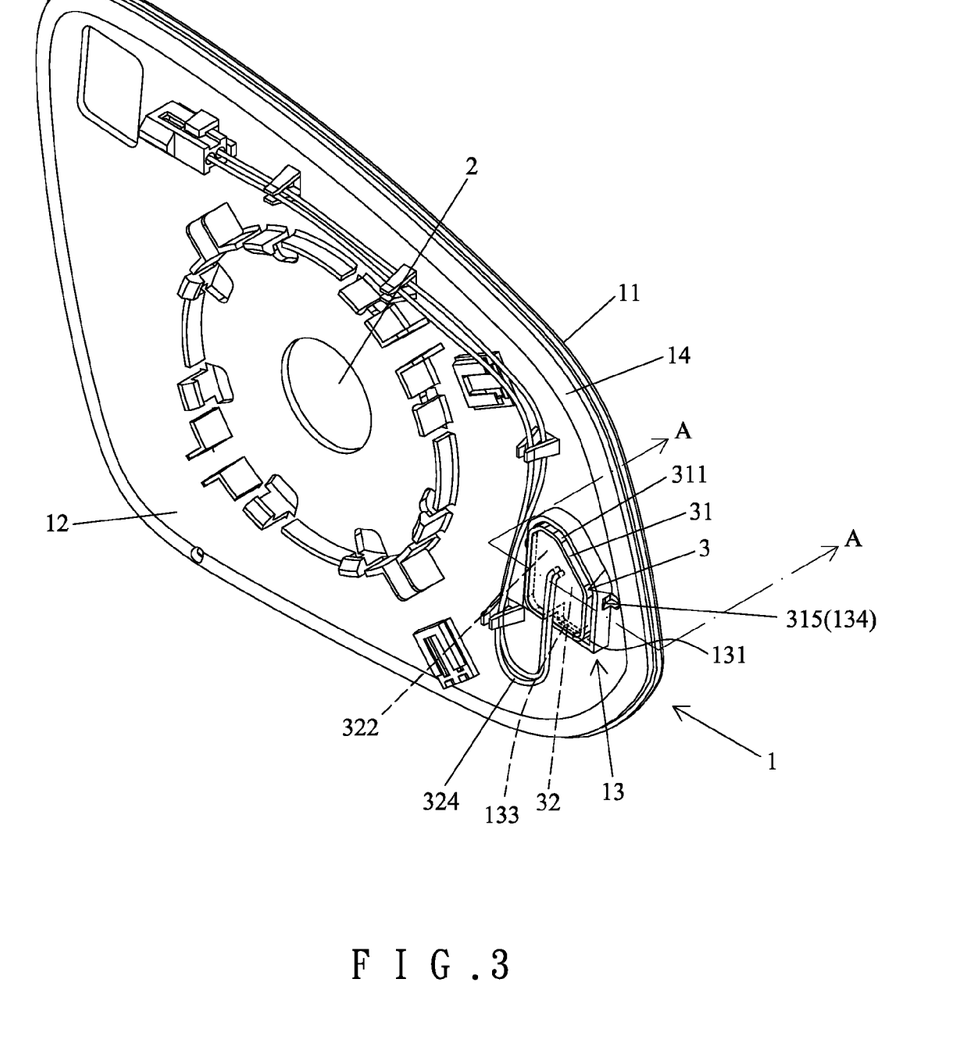
FIG. 3 is a perspective view of a mirror seat, a mirror, and the illumination device of the side view mirror of the first example according to the present invention.
Figure 4:
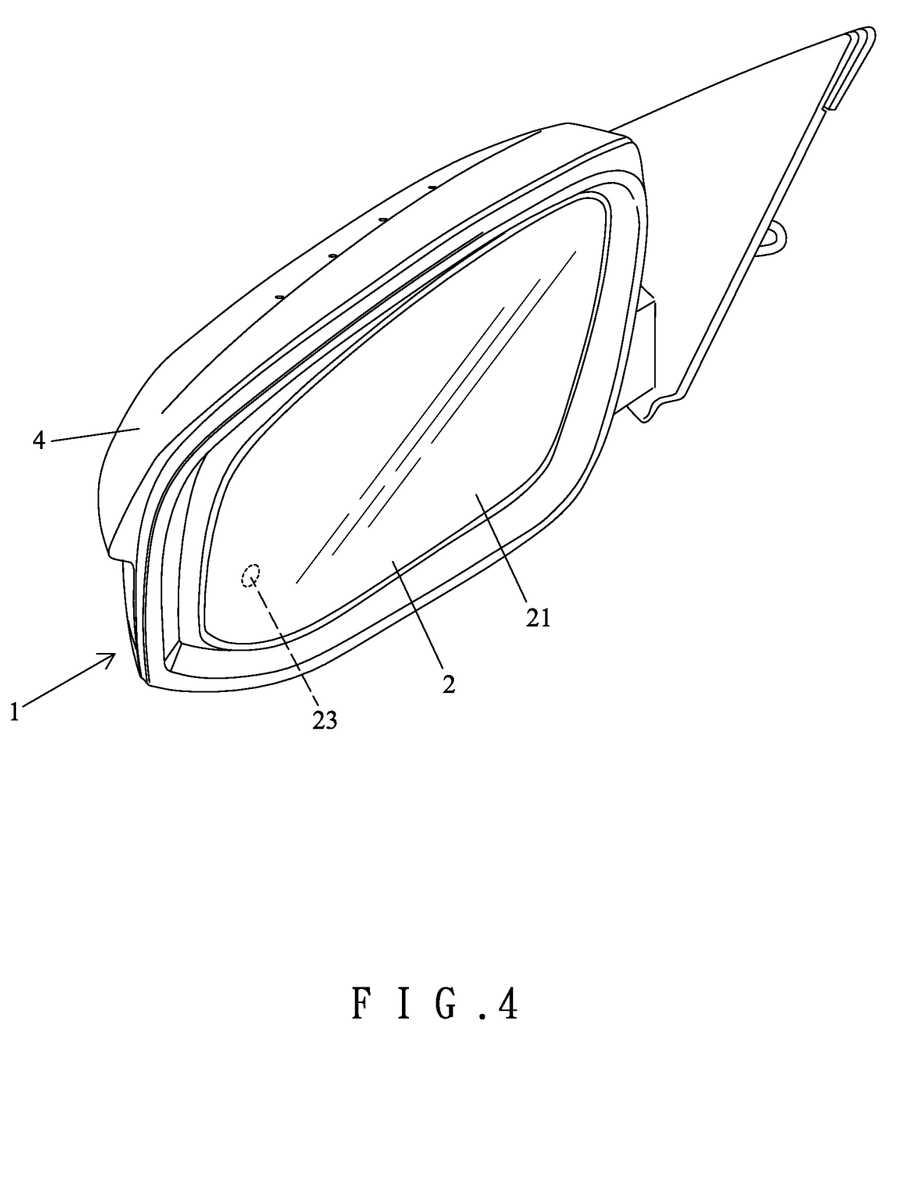
FIG. 4 is a perspective view of the side view mirror of the first example according to the present invention.

With reference to FIGS. 3 and 4, the rear cover 4 is mounted behind the mirror seat 1 and encloses the illumination device 3.

The circuit board 32, the lighting element 323, and the front sections of the wires 324 are mounted in the housing 31. Then, the glue material is used to sealingly cover the rear surface 322 of the circuit board 32, the front sections of the two wires 324, and the portion of the second annular wall 311 of the housing 31, forming the sealing portion 34 that provides a waterproof effect better than conventional structures, preventing water from entering the housing 31 to thereby prevent damage to the circuit board 32 and the lighting element 323.

As shown in FIG. 5, the light rays emitted by the lighting element 323 transmit through the optical lens portion 317. The light-impermeable first annular wall 132 of the mirror seat 1 avoids sideway scattering of the outputted rays. Furthermore, the hollow portion 351 of the double-sided tape 35 and the light-permeable section 23 of the rear face 22 of the mirror seat 2 are aligned with the optical lens portion 317 to permit direct transmission of the light rays, increasing the luminance When a person looks at the front side the mirror 2, the hollow portion 351 of the double-sided tape 35 is brighter whereas the other portion of the double-sided tape 35 is darker, providing an obvious lighting pattern.

The illumination device 3 of the first example according to the present invention can be electrically connected to a distance detection device (not shown) on a vehicle. The emitting direction of the illumination device 3 is towards the driver. When the distance detection device detects that the vehicle is near an object, the illuminating device 3 emits light to warn the driver, providing a warning effect.

Figure 6:
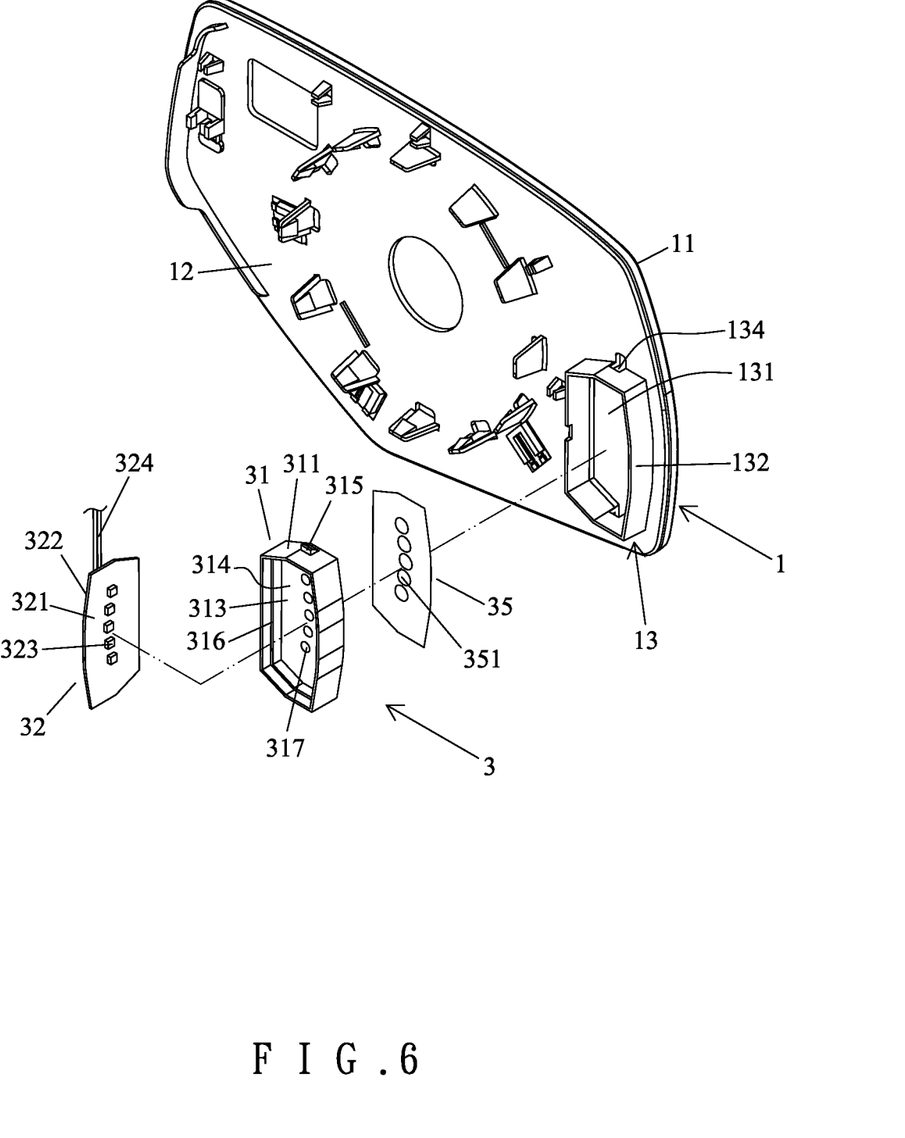
FIG. 6 is a partial, exploded, perspective view of a side view mirror of a second example according to the present invention.
Figure 7:
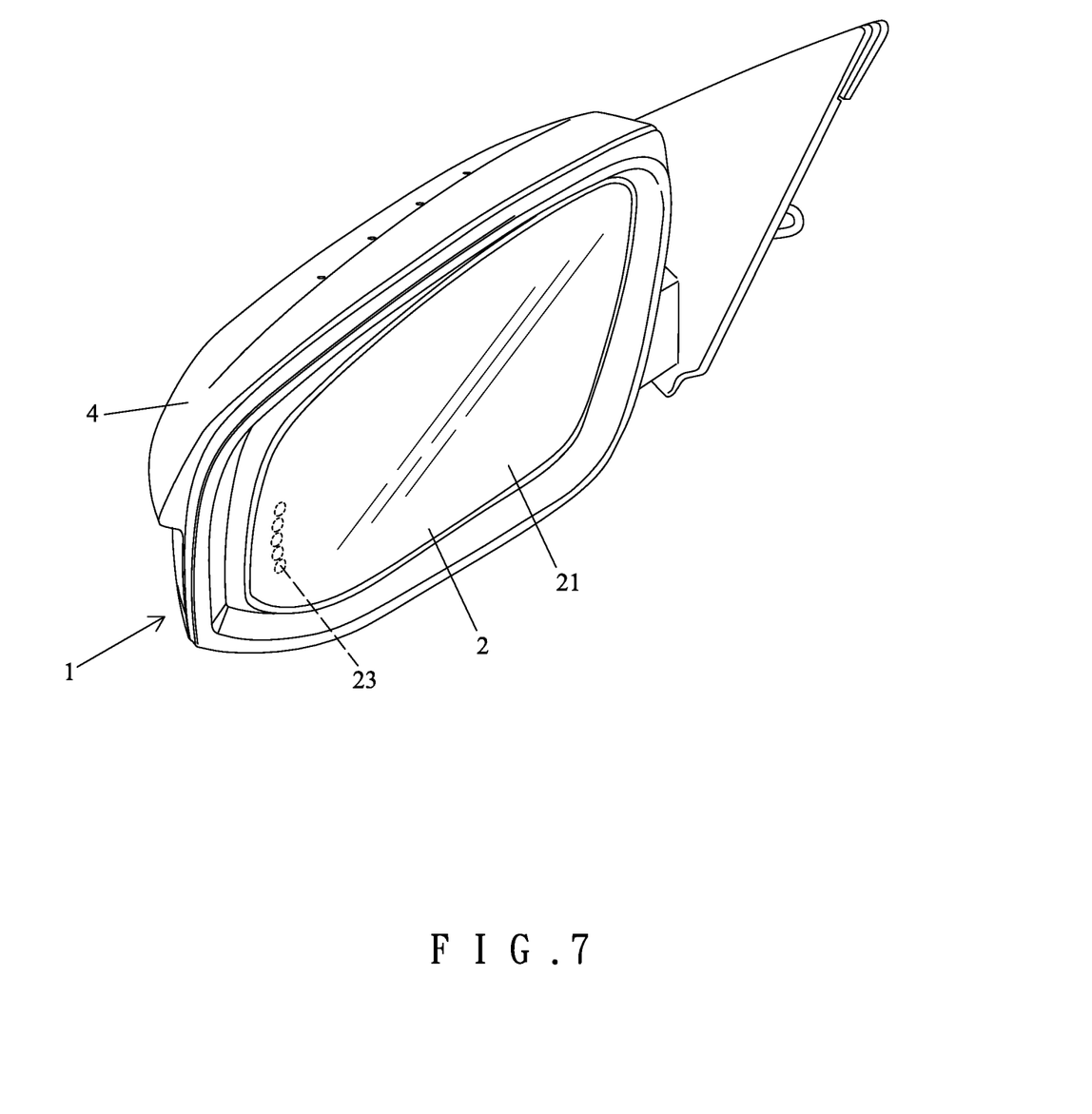
FIG. 7 is a perspective view of the side view mirror of the second example according to the present invention.

FIGS. 6 and 7 show a side view mirror of a second example according to the present invention. The second example is substantially the same as the first example except that the circuit board 32 includes five lighting elements 323, the inner face of the front wall 312 of the housing 31 includes five optical lens portions 317 aligned with the five lighting elements 323, and the double-sided tape 35 includes five hollow portions 351 aligned with the optical lens portions 317. Furthermore, the circuit board 32 can be connected to a circuit of a vehicular turn signal and can emit light rays while the vehicular turn signal is on, warning drivers of other vehicles behind the vehicle. Thus, the side view mirror can provide an active warning effect. Furthermore, the illumination device 3 can provide different warning effects according to different needs.

In view of the foregoing, the side view minor according to the present invention provides a better sealing/waterproof effect, a better luminance effect, prolongs the service life of the illumination device 3, and reduces the number of elements for assembling purposes. In a case that the double-sided tape 35 is not provided on the front wall 312 of the housing 31, the coupling member 315 of the housing 31 is assembled in the coupling groove 134 of the first annular wall 132 of the minor seat 1 to provide the equivalent assembling effect. Furthermore, in a case that the minor 2 does not include the light-permeable section 23, the light rays outputted by the lighting element 323 are concentrated by the optical lens portion 317 and then transmit through the reflective layer of the minor 2 to provide a warning light spot.

Although specific embodiments have been illustrated and described, numerous modifications and variations are still possible without departing from the scope of the invention. The scope of the invention is limited by the accompanying claims.

The invention claimed is:

1. A vehicular side view minor comprising:
a mirror seat including a front side and a rear side, with an engagement portion mounted on the rear side and including a through-hole having an inner periphery, with a first annular wall protruding rearwards from the inner periphery of the through-hole, and with the first annular wall not permeable to light;
a minor mounted in front of the minor seat, with the minor including a front face and a rear face, and with the rear face of the minor including a reflective layer;
an illumination device including a housing and a circuit board, with the housing permeable to light and including a second annular wall extending through the first annular wall, with the second annular wall including a front wall at a front end thereof, with the second annular wall further including a rear end having an opening, with the second annular wall further including an intermediate portion having a compartment, with the second annular wall further including an abutment portion on an inner face of the intermediate portion thereof, with the front wall including an optical lens portion protruding from an inner face of the front wall, with the housing mounted to the engagement portion of the minor seat, with the front wall facing the rear face of the minor, with the circuit board including a front surface and a rear surface, with the circuit board further including at least one lighting element and two wires, with the at least one lighting element mounted on the front surface of the circuit board, and with an emitting direction of the at least one lighting element being towards the optical lens portion of the housing, with the circuit board received in the compartment of the housing, with the circuit board including a periphery abutting the abutment portion, with the second annular wall further including a gluing space located behind the rear surface of the circuit board, with a gluing material filled in the gluing space and sealingly covering the rear surface of the circuit board, front sections of the two wires, and a portion of the second annular wall of the housing to form a sealing portion; and
a rear cover mounted behind the mirror seat and enclosing the illumination device.

2. The vehicular side view mirror as claimed in claim 1, wherein the abutment portion of the housing is an annular stepped portion, and wherein the front surface of the circuit board abuts the annular stepped portion.

3. The vehicular side view mirror as claimed in claim 1, with the first annular wall of the mirror seat including a coupling groove, with the second annular wall of the housing including a coupling member, and with the coupling member assembled in the coupling groove.

4. The vehicular side view mirror as claimed in claim 1, wherein the rear face of the mirror has a portion aligned with the engagement portion of the mirror seat, and wherein the portion of the rear face is a light-permeable section not covered by the reflective layer.

5. The vehicular side view mirror as claimed in claim 1, wherein the inner face of the front wall of the housing and the rear face of the mirror are glued together by a gluing element.

6. The vehicular side view mirror as claimed in claim 1, with the rear face of the minor having a portion aligned with the engagement portion of the minor seat, with the portion of the rear face being a light-permeable section not covered by the reflective layer, with the inner face of the front wall of the housing and the rear face of the minor glued together by a gluing element, with the gluing element being a double-sided tape including a hollow portion aligned with the optical lens portion.

7. The vehicular side view mirror as claimed in claim 2, with the circuit board received in the compartment of the housing, with the periphery of the circuit board abutting the annular stepped portion, wherein the gluing material in a liquid state is filled into the gluing space, and wherein the sealing portion is formed after the gluing material cures and engages with the rear surface of the circuit board, the front sections of the two wires, and the portion of the second annular wall of the housing.

8. The vehicular side view mirror as claimed in claim 5, wherein the gluing element is a double-sided tape including a hollow portion aligned with the optical lens portion.

* * * * *